3,100,717
ULTRAVIOLET LIGHT STABILIZED CELLULOSE ESTER PLASTIC COMPOSITION

Selma H. Long and John W. Tamblyn, Kingsport, Tenn., assignors to Eastman Kodak Company, Rochester, N.Y., a corporation of New Jersey
No Drawing. Filed Aug. 1, 1961, Ser. No. 128,379
3 Claims. (Cl. 106—194)

This invention relates to a cellulose ester plastic composition stabilized against weathering and particularly the action of ultraviolet light.

Cellulose esters, for example, cellulose acetate, cellulose butyrate, cellulose acetate-butyrate and the like, are well-known thermoplastic materials used in a vast number of atricles. However, cellulose esters are adversely affected by weathering, particularly by ultraviolet light. Consequently, much investigation of ways and means to stabilize cellulose ester plastics relative to ultraviolet light has been undertaken. Many additives have been suggested by the prior art for incorporation into cellulose ester plastic compositions as ultraviolet light stabilizers. For a variety of reasons none of these additives have been entirely satisfactory. Consequently, there is a need for new cellulose ester plastic compositions wherein the principal component, the cellulose ester, is stabilized relative to ultraviolet light.

An object of this invention is to provide a new cellulose ester plastic composition stabilized against the effects of ultraviolet light.

This object and others are achieved by this invention which is based on our discovery that manganous salicylate is an effective ultraviolet light stabilizer for cellulose esters.

In summary, this invention comprises a plastic composition stabilized relative to ultraviolet light, which comprises a cellulose ester and at a small but effective concentration manganous salicylate.

The cellulose ester employed as the plastic component of the plastic composition of this invention is an organic acid ester of cellulose. Examples of such an ester are the homogeneous esters such as cellulose acetate, cellulose propionate, cellulose butyrate and the mixed or heterogeneous esters such as cellulose acetate-propionate, and cellulose acetate-butyrate. Processes for making such an ester and the named cellulose esters in particular are well known and need not, therefore, be described herein.

Manganous salicylate is a compound readily prepared by neutralizing salicylic acid with manganous hydroxide or with manganous carbonate. For use as an ultraviolet stabilizer it is preferably in dry condition.

Concentration of the manganous salicylate in the plastic composition of this invention in general depends upon the extent of ultraviolet light stabilization desired. This in turn depends upon many variables, including the end use of the plastic composition. However, for most purposes a concentration of about 0.1–10 weight percent of the plastic composition gives satisfactory results.

The plastic composition of this invention is prepared preferably by roll-compounding the components thereof, which can include not only cellulose organic acid ester and manganous salicylate but also other components such as, for example, suitable plasticizers and the like.

This invention is further illustrated by the following example of a specific embodiment thereof. Unless otherwise indicated this invention is not limited to this embodiment.

Example

A plastic composition was prepared by roll-compounding for four minutes 100 parts by weight of cellulose acetate-butyrate (13 weight percent acetyl and 38 weight percent butyryl content) with 12 parts by weight of dibutyl sebacate as a plasticizer and 1 part by weight of manganous salicylate, the parts by weight being weight units. The temperature of the front roll was 270° F. and that of the back roll was 230° F. An ultraviolet light stabilized plastic composition was thereby obtained.

A sheet of this plastic composition, 50 mils thick, was compression molded at 320° F. for 10 minutes and then cut into plates having the dimensions 2.5 inches by 0.5 inch. Measurements were then made on the plates to determine pre-exposure flexural strength and inherent viscosity. These plates were then exposed to artificial weathering in a modified Atlas Twin-Arc Weather-Ometer (Anal. Chem. 25, 460 (1953)).

For purposes of comparison other plastic compositions were prepared in the same manner, formed into sheets and then plates by the same procedure, subjected to the same pre-exposure measurements and then placed in the modified Atlas Twin-Arc Weather-Ometer. Each of these other plastic compositions were formulated with 100 parts by weight of the cellulose acetate-butyrate used in making up the plastic compositions of this invention and 12 parts by weight of dibutyl sebacate. One of these plastic compositions contained no ultraviolet light stabilizer at all. The other plastic compositions contained 1 part by weight of the compounds identified in the Stabilizer column of the following table.

The progress of weathering damage to the test plates was followed quantitively by measurements of flexural strength, brittleness and inherent viscosity. Flexural strength was determined by the Tour-Marshall test for stiffness in flexure (ASTM D747–50), the specimen being bent with the weathered surface on the convex side. Brittleness was determined to have developed when a break occurred at a bend angle of less than 90°. Measurement of inherent viscosity (J. Colloid Sci. 1, 261 (1946), was made at 25° C. on a solution of 0.25 gram of the plastic composition per 100 milliliters of acetone.

From the data obtained in these weathering tests the relative stabilization efficiencies of the various compounds employed as ultraviolet stabilizers in the plastic compositions were rated on the bases of the following definitions:

(1) Stabilization rating based on retardation of flexural strength loss is the ratio of the exposure time required to cause 25% loss of flexural strength in the stabilized composition to the exposure time required to cause 25% loss of flexural strength in the unstabilized composition.

(2) Stabilization rating based on retardation of embrittlement is the ratio of the exposure time for development of brittleness in the stabilized composition to the exposure time for development of brittleness in the unstabilized composition.

(3) Stabilization rating based on retardation of viscosity is the ratio of the exposure time required for 25% loss of inherent viscosity in the stabilized composition to the exposure time for 25% loss of inherent viscosity in the unstabilized composition.

Under these definitions of stabilization ratings, a value of 1.0 indicates no ultraviolet light stabilization while values greater than 1.0 indicate positive degrees of ultraviolet light stabilization.

The following table summarizes the results of this extensive comparative testing:

| Stabilizer | Stabilization Rating Based on Retardation of— | | |
|---|---|---|---|
| | Flexural Strength Loss | Embrittlement | Inherent Viscosity Loss |
| None | 1.0 | 1.0 | 1.0 |
| Phenyl salicylate | 5 | 5 | 5 |
| Manganous lactate | 1.5 | 1 | 1.5 |
| Manganous p-amino-salicylate | 4 | 5 | 5 |
| Manganous salicylate | >18 | >17 | >15 |

Thus, the manganous salicylate in cellulose ester compositions has ultraviolet light stabilization ratings greater than those of chemically related compounds. Hence, there are provided cellulose ester plastic compositions of improved ultraviolet light stability.

A feature of advantage of the plastic compositions of this invention is the nonvolatility of the ultraviolet light stabilizer manganous salicylate. This enables the cellulose ester plastic compositions of this invention to be prepared at the usual compounding temperatures without loss of desired stability and without having excessive concentrations of stabilizer to compensate for loss of the stabilizer during compounding and under normal use conditions.

Other advantages, features and embodiments of this invention will occur to those in exercise of ordinary skill in the art upon reading the foregoing disclosure. All embodiments of this invention including variations and modifications thereof embracing the spirit and essential characteristics of this invention are within the scope of the claimed subject matter unless expressly excluded by claim language.

We claim:
1. A cellulose ester plastic composition consisting essentially of (1) a cellulose organic acid ester selected from the group consisting of cellulose acetate, cellulose propionate, cellulose butyrate, cellulose acetate-propionate and cellulose acetate-butyrate, and (2) manganous salicylate at an ultraviolet light stabilizing concentration.

2. A cellulose ester plastic composition consisting essentially of (1) a cellulose organic acid ester selected from the group consisting of cellulose acetate, cellulose propionate, cellulose butyrate, cellulose acetate-propionate and cellulose acetate-butyrate, and (2) manganous salicylate at a concentration in a range from about 0.1 to about 10 percent by weight.

3. A cellulose ester plastic composition consisting essentially of cellulose acetate-butyrate and about 0.1–10 weight percent of manganous salicylate.

References Cited in the file of this patent
UNITED STATES PATENTS

| | | |
|---|---|---|
| 2,432,521 | Horback et al. | Dec. 16, 1947 |
| 2,454,950 | Simpson et al. | Nov. 30, 1948 |
| 2,716,071 | Meyer et al. | Aug. 23, 1955 |
| 2,819,978 | Long et al. | Jan. 14, 1958 |
| 2,971,921 | Coleman et al. | Feb. 14, 1961 |